United States Patent [19]

Neuray et al.

[11] 3,978,159

[45] Aug. 31, 1976

[54] THERMOPLASTIC MOULDING COMPOSITIONS OF TRIAZINE-CONTAINING POLYCONDENSATES AND GRAFT POLYMERS

[75] Inventors: Dieter Neuray, Rumeln-Kaldenhausen; Hugo Vernaleken; Dieter Margotte, both of Krefeld; Josef Merten, Korschenbroich, all of Germany

[73] Assignee: Bayer Aktiengesellschaft, Germany

[22] Filed: Apr. 21, 1975

[21] Appl. No.: 570,010

[30] Foreign Application Priority Data
Apr. 24, 1974 Germany............................ 2419767

[52] U.S. Cl............................. 260/873; 260/47 XA; 260/49; 260/867; 260/868; 260/869; 260/870
[51] Int. Cl.²........................................ C08L 67/06
[58] Field of Search................ 260/873, 49, 47 XA, 260/867, 868, 869, 870

[56] References Cited
UNITED STATES PATENTS
3,894,991  7/1975  Neuray et al. ................. 260/47 XA

*Primary Examiner*—J. Ziegler
*Attorney, Agent, or Firm*—Connolly and Hutz

[57] ABSTRACT

Thermoplastic moulding compositions of
A. 15 to 80 % by weight of an aromatic polycondensate containing s-triazine rings, and
B. 20 to 85 % by weight of a graft polymer obtained by polymerizing a mixture of
B.1. 50 to 90 % by weight of styrene, α-methyl styrene, methyl methacrylate or mixtures thereof and
B.2. 10 to 50 % by weight of acrylonitrile, methacrylonitrile, methyl methacrylate or mixtures thereof,
onto a diene or acrylate rubber, the mixture as a whole containing from 5 to 25 % by weight of s-triazine rings, based on (A) and (B), and 5 to 40% by weight of rubber, based on (A) and (B).

7 Claims, No Drawings

THERMOPLASTIC MOULDING COMPOSITIONS OF TRIAZINE-CONTAINING POLYCONDENSATES AND GRAFT POLYMERS

This invention relates to thermoplastic moulding compositions of
A. 15 to 80 % by weight of an aromatic polycondensate containing s-triazine rings, and
B. 20 to 85 % by weight of a graft polymer obtained by polymerising, onto a diene or acrylate rubber, a mixture of
B.1. 50 to 90 % by weight of styrene, α-methyl styrene, methyl methacrylate or mixtures thereof and
B.2. 10 to 50 % by weight of acrylonitrile, methacrylonitrile, methyl methacrylate or mixtures thereof,
the mixture as a whole containing from 5 to 25 % by weight of s-triazine rings, based on (A) and (B).

The aromatic polycondensates containing s-triazine rings are preferably aromatic polycondensates having recurring structural units corresponding to the formula

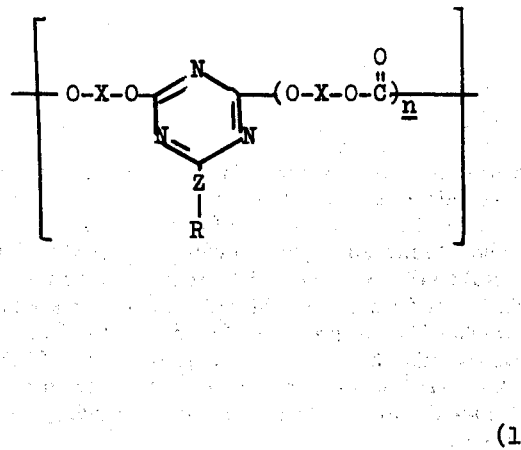

(1)

in which
n is a number from 1 to 20,
X represents an optionally monosubstituted or polysubstituted o-, m- or p-phenylene radical (substituents: for example $C_1$–$C_4$-alkyl, chlorine, bromine, fluorine, iodine) or a radical corresponding to the formula:

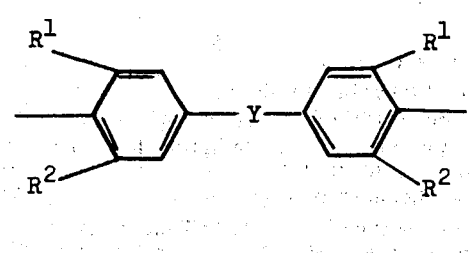

(2)

in which $R^1$ and $R^2$ which may be the same or different, represent hydrogen, $C_1$–$C_4$-alkyl or halogen (e.g. chlorine, bromine),
Y represents a single bond, a $C_1$–$C_7$-alkylene or alkylidene radical, a $C_5$–$C_{12}$-cycloalkylene or cycloalkylidene radical, —O—, —S—, —CO—, —SO—, —$SO_2$— or a radical corresponding to either of the following formulae:

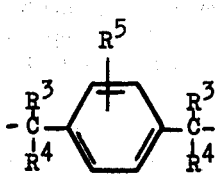 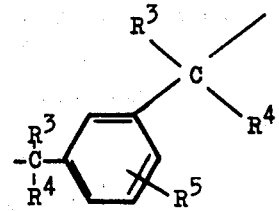

(3a) (3b)

in which
$R^3$ to $R^5$ represent hydrogen or $C_1$–$C_4$-alkyl and
$R^5$ additionally represents halogen (e.g. chlorine, bromine, represents a single bond, —O—, —S—, —NH— or —$NR^6$—,
R represents hydrogen, $C_1$–$C_5$-alkyl, $C_2$–$C_6$-alkenyl, $C_5$–$C_6$-cycloalkyl, optionally substituted aryl radicals having up to 14 carbon atoms (substituents: for example $C_1$–$C_4$-alkyl, $C_1$–$C_4$-alkoxy, chlorine, bromine, —$NO_2$, —CN) or alkylaryl having up to 15 carbon atoms, and
$R^6$ has the same meaning as R, or $R^6$ and R together with the nitrogen atom to which they are attached form a 5- to 6-membered aliphatic or heterocyclic ring or a ring corresponding to the formula:

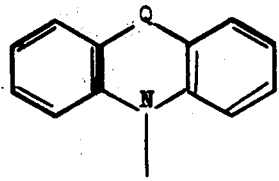

(4)

in which
Q represents a single bond, a methylene group, oxygen or sulphur.

The thermoplastic moulding compositions according to the invention have outstanding mechanical strength, surprisingly high notched impact strength and very high dimensional stability under heat (according to Vicat). They are resistant to hydrolysis under the effect of aqueous alkali and have a high tracking resistance. They are further distinguished by astonishingly good non-inflammability. expressed for example in a high $O_2$-index, and a high resistance to chemicals, shown for example in minimal stress crazing under the effect of chlorinated hydrocarbons, and for two-phase systems show surprisingly high strength in the weld lines of injection mouldings.

The products may be easily processed into shaped articles at temperatures in the range from 220° to 270°C and may be released from a mould under slight pressure over a wide temperature range, thus providing for short injection cycles.

AROMATIC POLYCONDENSATES (A) CONTAINING S-TRIAZINE RINGS

Aromatic polycondensates containing s-triazine rings of formula (1) are known from patent application No. P 22 46 106.9. They may be obtained for example by reacting dichloro-s-triazines corresponding to the formula:

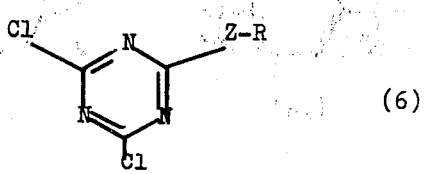

(6)

in which:
Z and R are as defined above,
with 2 to 21 equivalents of the alkali salts of an aromatic dihydroxy compound corresponding to the formula $$HO - X - OH \qquad (7)$$

in which
X is as defined above,
by known methods, for example in a two-phase mixture of an organic solvent which is inert with respect to the reactants and an aqueous-alkaline phase, at temperatures in the range from 30° to 150°C and over reaction times of from 0.2 to 20 hours followed by direct reaction of the s-triazine-containing aromatic dihydroxy compounds of formula (8) given below which are formed as intermediates

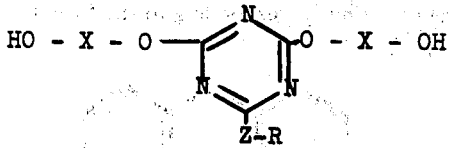

(8)

either individually or in admixture with excess aromatic dihydroxy compound, depending upon the molar ratio used for reaction of the dichloro-s-triazine with the dihydroxy compound, with phosgene or other chlorocarbonic acid derivatives of aromatic dihydroxy compounds by phase interface polycondensation under polycarbonate-forming conditions.

It is possible to simultaneously react both a plurality of different dichloro-s-triazines and also a plurality different aromatic dihydroxy compounds in cases where a corresponding triazine-containing copolycondensate is required for the production of thermoplastic moulding compositions in accordance with the invention. Similarly, triazine-containing bisphenols of formula (8) and aromatic dihydroxy compounds (7) may be reacted with polycarbonate-forming derivatives of carbonic acid even if X is not identical in both hydroxy components.

In the context of the invention, triazine-containing polycondensates suitable for the production of thermoplastic moulding compositions according to the invention also include polycondensates which are branched through structural units corresponding to the formula:

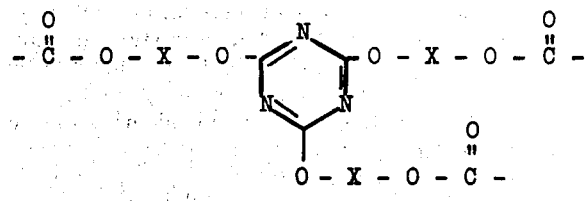

(9)

in which
X is as defined above,
these units being present in the triazine-containing polycondensate in quantities of from 0.05 to 2.0 mol %, based on the structural unit of formula (1).

These branched products are obtained in accordance with DT-OS No. 2,246,106 by reacting a dihalogen-s-triazine of formula (6) with a dihydroxy compound of formula (7) in the presence of 0.05 to 2 mol % of cyanuric chloride, based on the structural unit of formula (1), the intermediate products formed including trifunctional hydroxy compounds corresponding to the formula

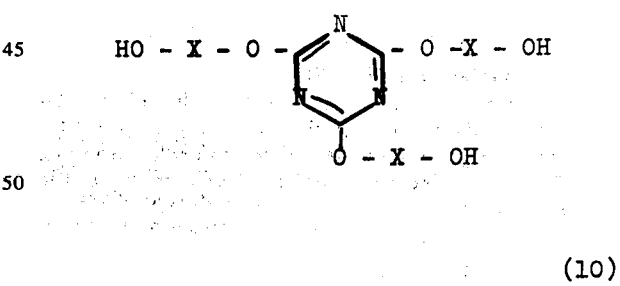

(10)

wherein X is defined as above
which branch the products through s-triazine rings during subsequent polycondensation, for example with phosgene.

The polycondensates may of course also be branched through the incorporation of small quantities of polyhydroxy compounds, for example 0.05 to 2.0 mol % (based on structural units of formula (1). Polycondensates of this kind are described, for example, in DT-OS No. 1,570,533; DT-OS No. 2,116,974; DT-OS No. 2,113,347; GB-PS No. 885,442; GB-PS No. 1,079,821 and in US-PS No. 3,544,514. Examples of suitable polyhydroxy compounds include phloroglucinol, 4,6- dimethyl-2,4,6-tris-(4-hydroxyphenyl)-2-heptene, 4,6-dimethyl-2,4,6-tris-(4-hydroxyphenyl)-heptane, 1,3,5-tris-(4-hydroxyphenyl)-benzene, 1,1,1-tris-(4-hydroxyphenyl) ethane, tris-(4-hydroxyphenyl)-phenyl methane, 2,2-bis-[4,4-(4,4'-dihydroxydiphenyl)-cyclohexyl]-propane, 2,4-bis-(4-hydroxy-phenyl-4-isopropyl)-phenol, 2,6-bis-(2'-hydroxy-5'-methyl benzyl)-4-methyl phenol, 2,4-dihydroxy benzoic acid, 2-(4-hydroxyphenyl)-2-(2,4-dihydroxyphenyl)-propane and 1,4-bis-(4,4'-dihydroxy triphenyl methyl)-benzene.

The s-triazine-containing polycondensates suitable for use in the production of the moulding compositions according to the invention generally have molecular weights ($M_w$) of from 10,000 to 200,000, preferably from 20,000 to 60,000.

GRAFT RUBBERS (B)

The graft rubbers used for the production of the thermoplastic moulding compositions according to the invention are also known (cf. GB-PS No. 794,400).

They are obtained, for example, by the radical emulsion polymerisation of the graft monomers (B.1) and (B.2) in the presence of a rubber latex. The following rubbers are particularly suitable for the purposes of the invention: polybutadiene, butadiene-styrene copolymers, butadieneacrylate copolymers and polyacrylates. In the present context, "acrylate" means $C_1$–$C_6$-alkyl esters of acrylic acid and methacrylic acid, for example ethyl acrylate, methyl methacrylate or butyl acrylate. The rubbers, especially where they are copolymers, may also contain small quantities (up to about 10 % by weight) of other monomers, such as methacrylamide, methacrylamide methylol ether, acrylic acid, divinyl benzene or ethylene glycol dimethacrylate, depending upon the type of rubber. In general, 10 to 200 parts by weight of monomer are grafted onto 100 parts by weight of rubber. In general, grafting is not complete, so that, in addition to the monomers polymerised onto the rubber, a copolymer is also formed from these monomers. It is generally in the form of a resin-like substance. It is also possible to polymerise only part of the monomers in the presence of the rubber and to add the rest of the monomers in the form of a separately polymerised resin. The important factor is that the mixture obtained should have a rubber content of from about 5 to about 40 % by weight, and that enough monomer is actually graft-polymerised to guarantee compatability of the grafted rubber with the resin.

It is particularly preferred to use mixtures of 10 to 100 % by weight of a graft polymer of:
10 to 90 parts by weight of a monomer mixture of:
50 to 90 % by weight of styrene and
50 to 10 % by weight of acrylonitrile grafted on
90 to 10 parts by weight of polybutadiene, a copolymer of butadiene and acrylonitrile (which optionally contains small quantities of methacrylic acid and/or divinyl benzene) or polybutyl acrylate (which optionally contains small quantities of methacrylamido methylol ether); and
0 to 90 % by weight of a resin-like copolymer of: 50 to 90 % by weight of styrene and 50 to 10 % by weight of acrylonitrile.

Accordingly, the term "graft rubber" as used in the context of the invention not only applies to the pure graft polymer, but also to its mixtures with copolymers separately prepared from the graft monomers or formed during the grafting reaction.

Preferred thermoplastic moulding compositions according to the invention are moulding compositions of
A. 15 to 80 % by weight of polycondensates containing s-triazine rings of formula (1), in which
Z represents a covalent bond, —NH— or —NR$^6$—,
R and R$^6$ are as defined above,
X represents a radical characterised by formula (2) in which
R$^1$ = R$^2$ and represents hydrogen atoms, methyl radicals, chlorine or bromine atoms,
Y represents a methylene, isopropylidene or cyclohexylidene radical; and
n is a number from 2 to 10, and
B. 20 to 85 % by weight of graft polymers corresponding to the above definition.

Particularly preferred thermoplastic moulding compositions are moulding compositions of
A. 20 to 70 % by weight of aromatic polycondensates containing s-triazine rings of formula (1), in which
Z represents a covalent bond or —NR$^6$—,
R and R$^6$ represent a phenyl radical,
X represents

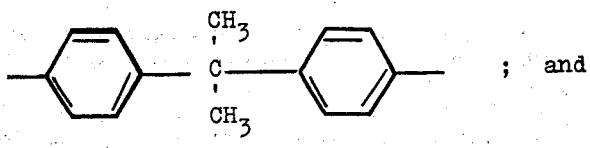 ; and n is a number from 2 to 10, and
B. 30 to 80 % by weight of graft polymers corresponding to the above definition.

The thermoplastic moulding compositions according to the invention may be prepared in the usual way by mixing the starting polymers in the melt in mixing machines such as, for example, extruders, internal kneaders or roll stands. The starting polymers may of course also be dissolved together in a solvent or solvent mixture, from which the polymer mixture is obtained either by precipitating the solution in an antisolvent or by concentrating the solution by evaporation.

The mixtures according to the invention may contain fillers, for example minerals, sawdust, carbon black or glass fibres, dyes, pigments and the usual additives, such as heat stabilisers, oxidation stabilisers, UV stabilisers and other stabilisers, plasticisers, lubricants, mould-release agents, flameproofing additives such as, for example, halogenated organic compounds, metal oxides, metal salts, organic phosphates and other additives. They may be used for any application requiring high impact and notched impact strength, high dimensional stability when heated, favourable electrical insulating properties, resistance to alkalis and solvents and reduced flammability for example for the production of housing sections for special domestic appliances, electrical appliances (electric razors, hairdryers) and office machines (computer casings, typewriters and calculating machines), vessels, telephone casings, electrical boxes and many other mouldings.

EXAMPLES

Mixtures of s-triazine-containing polycarbonates and graft polymers

Various s-triazine-containing polycondensates (a–d) are homogenised with various graft polymers (e, f) in different weight ratios in the melt at 200° to 250°C using a double-shaft extruder, and subsequently processed into mouldings at 230° to 260°C.

a. Polycondensate containing diphenyl amino-s-triazine, having a relative viscosity of 1.297 ($\overline{M}_w$ = 49,000), obtained by polycondensing 15 mol parts of 2-diphenyl amino-4,6-dichloro-s-triazine and 85 mol parts of bisphenol A with phosgene in accordance with DT-OS No. 2,246,106.

b. Polycondensate containing diphenyl amino-s-triazine, having a relative viscosity of 1.306 ($\overline{M}_w$ = 54,000), obtained by polycondensing 30 mol parts of 2-diphenyl amino-4,6-dichloro-s-triazine and 70 mol parts of bisphenol A with phosgene in accordance with DT-OS No. 2,246,106.

c. Branched polycondensate containing diphenyl amino-s-triazine, having a relative visosity of 1.285 ($\overline{M}_w$ = 53,000), obtained by polycondensing 20 mol parts of 2-diphenyl amino-4,6-dichloro-s-triazine, 80 mol parts of bisphenol A and 0.2 mol % of cyanuric chloride (based on dichloro triazine + bisphenol A) with phosgene in accordance with DT-OS No. 2,246,106.

d. Polycondensate containing phenyl-s-triazine, having a relative viscosity of 1.290 ($\overline{M}_w$ = 46,000), obtained by polycondensing 20 mol parts of 2-phenyl-4,6-dichloro-s-triazine and 80 mol parts of bisphenol A with phosgene in accordance with DT-OS No. 2,246,106.

e. A mixture of
1. 30 parts by weight of a graft polymer, obtained by grafting 35 parts by weight of styrene and 15 parts by weight of acrylonitrile onto 50 parts by weight of a coarse-particle polybutadiene (in accordance with DT-AS Nos. 1,247,655 and 1,269,360), the average particle diameter of the polybutadiene graft base present in latex form being between 0.3 and 0.4µ, and
2. 70 parts by weight of a copolymer of 70 parts by weight of styrene and 30 parts by weight of acrylonitrile having an intrinsic viscosity [ η ] of 79.8 (as measured in dimethyl formamide at 20°C);

f. A mixture of
1. 40 parts by weight of an emulsion graft polymer obtained by grafting 35 parts by weight of styrene and 15 parts by weight of acrylonitrile onto 50 parts by weight of a copolymer of 96 parts by weight of butyl acrylate and 4 parts by weight of methacrylamide N-methylol methyl ether and
2. 60 parts by weight of a copolymer of 70 parts by weight of styrene and 30 parts by weight of acrylonitrile having an intrinsic viscosity [ η ] of 80.1 (as measured in dimethyl formamide at 20°C);

The compositions and a few properties of the mixtures are set out in Table 1.

Table 1

| Example | | | 1 | 2 | 3 | 4 | 5 | 6 | 7 |
|---|---|---|---|---|---|---|---|---|---|
| triazine polycondensate | a) | [% by weight] | 100 | 40 | — | — | — | — | — |
| triazine polycondensate | b) | [% by weight] | — | — | 100 | 60 | — | — | 20 |
| triazine polycondensate | c) | [% by weight] | — | — | — | — | 50 | — | — |
| triazine polycondensate | d) | [% by weight] | — | — | — | — | — | 70 | — |
| graft polymer | e) | [% by weight] | — | 60 | — | — | — | 30 | 80 |
| graft polymer | f) | [% by weight] | — | — | — | 40 | 50 | — | — |
| elongation at break (DIN 53 455) (%) | | | 80 | 63 | 30 | 42 | 49 | 45 | 40 |
| E-modulus (DIN 53 457) (MPa) | | | 2500 | 1780 | 2700 | 2050 | 1950 | 2100 | 1520 |
| impact strength at 23°C (DIN 53 453) (kJ/m²) | | | unbr.** | unbr. | unbr. | unbr. | unbr. | unbr. | unbr. |
| notched impact strength at 23°C (DIN 53 453) (kJ/m²) | | | 6 | 25 | 4 | 18 | 22 | 18 | 20 |
| weld line strength*) (kJ/m²) | | | 5 | 8 | 4 | 7 | 8 | 7 | 10 |
| Vicat temperature VST/A (DIN 53 460) (°C) | | | 167 | 142 | 180 | 149 | 145 | 147 | 130 |
| Vicat temperature VST/B (DIN 53 460) (°C) | | | 162 | 120 | 170 | 130 | 124 | 123 | 115 |
| O₂-index (ASTM D 2863-70) | | | 31 | 25 | 35 | 29 | 27 | 28 | 26 |
| tracking resistance (test solution F) (DIN 53 480/6) (new) (V) | | | 250 | >300 | 260 | >300 | >300 | >300 | >300 |

*)weld line strength, measured as described in P 23 29 585.4
**)unbroken

We claim:
1. A thermoplastic moulding composition comprising
    A. from 15 to 80 % by weight of an aromatic polycondensate containing s-triazine rings and
    B. from 20 to 85 % by weight of a graft polymer obtained by polymerizing onto a diene or acrylate rubber a mixture of
        i. from 50 to 90 % by weight of at least one monomer selected from the group consisting of styrene, α-methyl styrene and methyl methacrylate and
        ii. from 10 to 50 % by weight of at least one monomer selected from the group consisting of acrylonitrile, methacrylonitrile and methyl methacrylate,
    the mixture as a whole containing from 5 to 25 % by weight of s-triazine rings and 5 to 40 % by weight of rubber, based on (A) and (B) and said aromatic polycondensate (A) containing s-triazine rings having recurring structural units corresponding to the formula

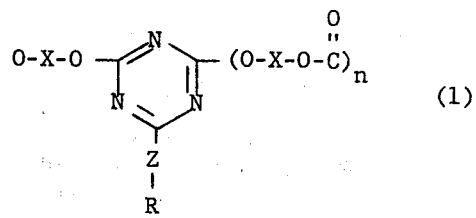

(1)

wherein
n is a number from 1 to 20;
X is an optionally monosubstituted or polysubstituted o, m or p-phenylene radical or a radical of the formula

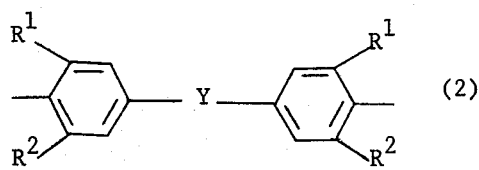

(2)

wherein
R¹ and R², which may be the same or different, are hydrogen, C₁–C₄-alkyl or halogen and
Y is a single bond, a C₁–C₇-alkylene or alkylidene radical,
a C₅–C₁₂-cycloalkylene or cycloalkylidene radical, —O—, —S—, —CO—, —SO—, —SO₂—,

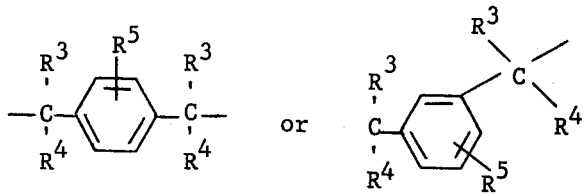

wherein
R³ and R⁴, which may be the same or different, are hydrogen or C₁–C₄-alkyl and
R⁵ is hydrogen, C₁–C₄-alkyl or halogen;
Z is a single bond, —O—, —S—, —NH— or —NR⁶— and
R and R⁶ are each separately hydrogen, C₁–C₅-alkyl, C₂–C₆-alkenyl, C₅–C₆-cycloalkyl, an optionally substituted aryl radical having up to 14 carbon atoms or alkaryl having up to 15 carbon atoms or
R⁶ and R are together with the nitrogen atom to which they are attached a 5- or 6-membered aliphatic or heterocyclic ring, or a ring of the formula

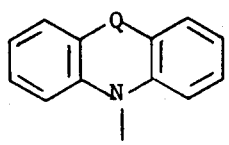

wherein
Q is a single bond, methylene, —O— or —S—.

2. A thermoplastic composition as claimed in claim 1, in which X is substituted by C₁–C₄-alkyl, chlorine, bromine, fluorine or iodine.

3. A thermoplastic composition as claimed in claim 1, in which R₁, R₂, and R₅, which may be the same or different, are chlorine or bromine.

4. A thermoplastic composition as claimed in claim 1, in which R is aryl substituted by C₁–C₄-alkyl, C₁–C₄-alkoxy, chlorine, bromine, —NO₂ or CN.

5. A thermoplastic moulding composition as claimed in claim 1 in which the aromatic polycondensate (A) containing s-triazine rings is branched by means of structural units corresponding to the formula

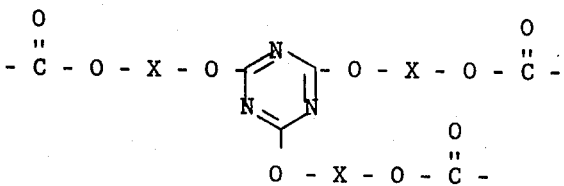

wherein X is as aforesaid,
said structural units being present in the s-triazine-containing polycondensate in quantities of from 0.05 to 2.0 mol % based on the recurring structural units of formula (1).

6. A thermoplastic moulding composition as claimed in claim 1 comprising
A. from 15 to 80 % by weight of an s-triazine-containing polycondensate having recurring structural units of formula (1) wherein
Z is a single bond, —NH— or —NR⁶—;
X is a radical of formula (2) wherein
R¹ and R² are the same and are hydrogen, methyl, chlorine or bromine;
Y is methylene, isopropylidene or cyclohexylidene and
n is a number from 2 to 10 and
B. from 20 to 85 % by weight of a graft polymer obtained by polymerizing onto a diene or acrylate rubber a mixture of
i. 50 to 90 % by weight of at least one monomer selected from the group consisting of styrene, α-methyl styrene and methyl methacrylate and
ii. 10 to 50 % by weight of at least one monomer selected from the group consisting of acrylonitrile, methacrylonitrile and methyl methacrylate.

7. A thermoplastic moulding composition as claimed in claim 1 comprising
A. from 20 to 70 % by weight of an s-triazine-containing aromatic polycondensate having recurring structural units of formula (1) wherein
Z is a covalent single bond or —NR⁶—;
R and R⁶ are phenyl;
X is

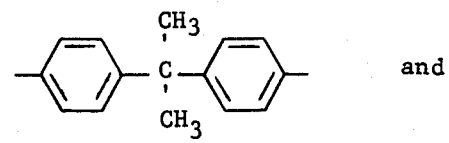 and n is an integer from 2 to 10 and
B. from 30 to 80 % by weight of a graft polymer obtained by polymerizing onto a diene or acrylate rubber a mixture of
i. from 50 to 90 % by weight of at least one monomer selected from the group consisting of styrene, α-methyl styrene and methyl methacrylate and
ii. from 10 to 50 % by weight of at least one monomer selected from the group consisting of acrylonitrile, methacrylonitrile and methyl methacrylate.

* * * * *

UNITED STATES PATENT AND TRADEMARK OFFICE
CERTIFICATE OF CORRECTION

PATENT NO. : 3,978,159
DATED : August 31, 1976
INVENTOR(S) : Dieter Neuray et al It is certified that error appears in the above-identified patent and that said Letters Patent are hereby corrected as shown below:

Col. 2, line 36, "bromine, represents" should read -- bromine, Z represents --.

Signed and Sealed this

Fourteenth Day of December 1976

[SEAL]

Attest:

RUTH C. MASON
*Attesting Officer*

C. MARSHALL DANN
*Commissioner of Patents and Trademarks*